UNITED STATES PATENT OFFICE.

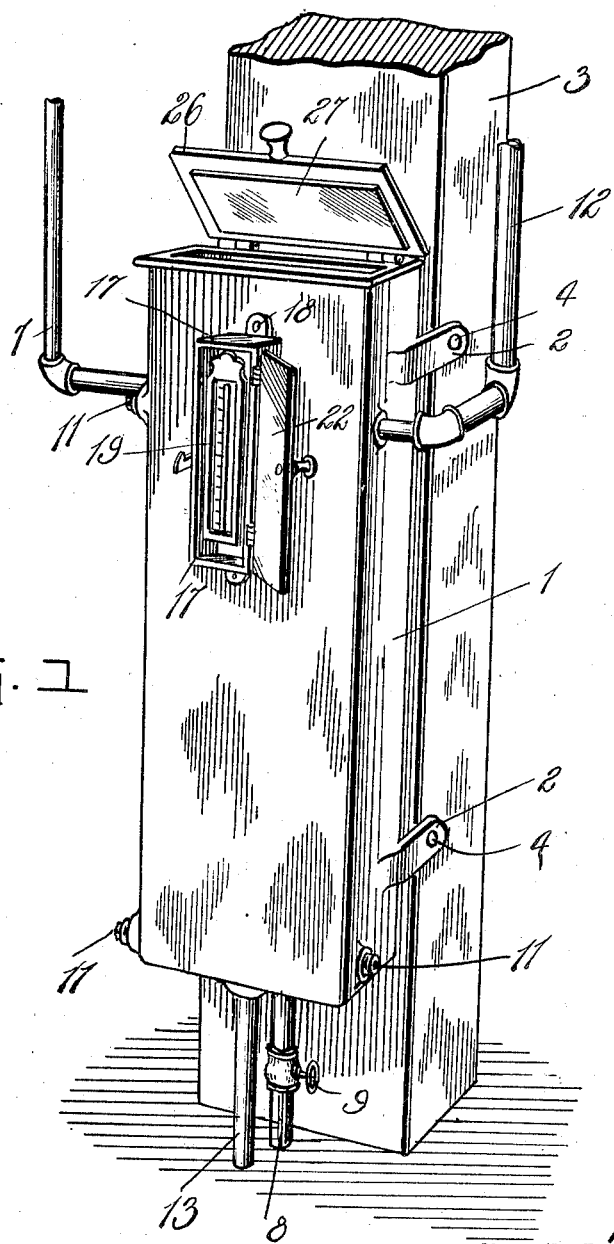

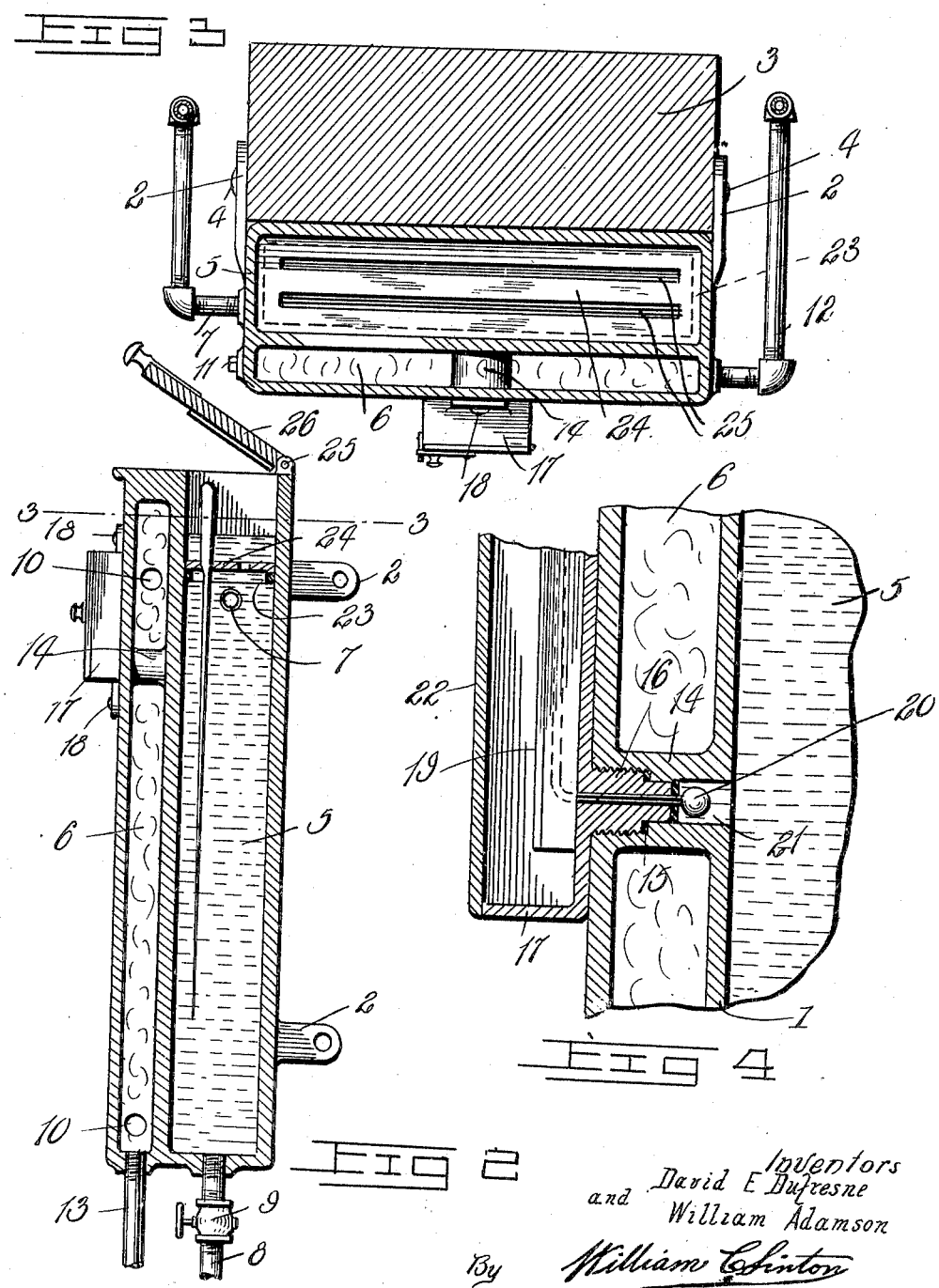

DAVID E. DUFRESNE, OF ST. LAMBERT, AND WILLIAM ADAMSON, OF MAISONNEUVE, QUEBEC, CANADA.

STERILIZER.

1,315,951. Specification of Letters Patent. Patented Sept. 16, 1919.

Application filed May 6, 1919. Serial No. 295,091.

*To all whom it may concern:*

Be it known that we, DAVID E. DUFRESNE and WILLIAM ADAMSON, both subjects of the King of Great Britain, residing at St. Lambert and Maisonneuve, respectively, Province of Quebec, Canada, have invented certain new and useful Improvements in Sterilizers; and we do hereby declare that the following is a full, clear, and exact description of the invention, such as will enable others skilled in the art to which it appertains to make and use the same.

The present invention relates to a sterilizer to be used more particularly in abattoirs for sterilizing the cutting implements and tools, and an object of the invention is to provide an apparatus of this character which can be easily and readily installed in any convenient place within an abattoir and exhaust steam may be used for raising the temperature of the water which is used for cleansing the implements.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a perspective view of the sterilizer embodying the present invention when installed;

Fig. 2 is a vertical section through the same;

Fig. 3 is a horizontal section taken on the line 3—3 of Fig. 2; and,

Fig. 4 is an enlarged detail section.

Referring now more particularly to the accompanying drawings wherein like and corresponding parts are designated by similar reference characters throughout the several views.

The sterilizer comprises a receptacle 1 which is preferably cast in a single unit having formed therewith the projecting lugs 2 so that the apparatus may be suspended upon a pillar or other support 3 by means of the bolts 4. This receptacle is preferably rectangular in configuration and is provided with a chamber 5 having its upper end open. The front wall of this receptacle has formed therein a jacketed chamber 6 through which live steam may pass for heating the water contained within the chamber 5. Leading to the chamber 5 is an inlet pipe 7 so that sterilized water may flow within the chamber 5 and leading from the bottom of this chamber 5 is an outlet pipe 8 having a valve 9 therein whereby the water contained within the chamber 5 may be drawn therefrom and any sediment accumulated within the bottom of the chamber 5 may be removed. The jacketed front wall of this receptacle is provided with four inlet openings 10 which are adapted to be closed by means of the plugs 11, and communicating with one of these openings 10 is an inlet pipe 12 which supplies the live steam within the chamber 6 and leading from this chamber 6 is an outlet or return pipe 13 through which may pass the used steam. This jacketed front wall of the receptacle is provided with a cast portion 14 having a threaded opening 15 therein and adapted to extend within this threaded opening 15 is a plug 16 which plug is formed with the casing 17. This casing 17 may be connected to the front wall of the receptacle by means of the bolt 18 so that it may be retained in place as better shown in Fig. 1. Arranged within this casing 17 is a thermometer 19 and the lower end of the mercury tube of this thermometer extends through the plug 16 and the bulb 20 of the mercury tube rests within the recess 21 formed within the inner face of the front wall of the receptacle so that it will be in contact with the water within the chamber 5 whereby the temperature of this water may be registered upon the thermometer 19. The casing 17 is provided with a hingedly connected door 22 whereby the thermometer arranged within the casing may be further protected.

Arranged within the receptacle 5 adjacent its opened end is a flange 23 and adapted to rest upon this flange 23 is a plate 24 preferably made of hard wood and this plate 24 has formed therein two elongated slots 25. The blades of the cutting tools and implements, such as knives, saws and the like, may extend down through the slots 25 and the plate 24 will support the implements. The water contained within the receptacle 5 will sterilize the blades of the cutting implements and the boiling water rising above the plate 24 will sterilize a portion of the handles of the implements which need sterilizatiton, but this plate 24 will prevent the boiling water contained within the receptacle 5 from boiling over or injuring the hands of the operator when placing the implements within the sterilizer or removing the same therefrom. Hingedly connected to the receptacle 1 as at 25′ is a cover 26 which is adapted to close the top of the receptacle and the lower face of this cover 26 is provided with a rubber gasket which is adapted to rest within the upper end of the receptacle 5 so as to retain the heat within the receptacle while the temperature of the water contained therein is being raised.

From the foregoing it is obvious that the exhaust steam from the power plant may be used for heating the sterilizing water by injecting this steam within the jacketed front wall of the receptacle. The heat from the steam will cause the temperature of the water contained within the receptacle 5 to rise until it has obtained a degree of approximately 220°. When the water contained within the receptacle 5 has obtained this degree the operators may insert their cutting implements within the sterilizer, thereby causing the implements to be thoroughly sterilized when not in use.

When the cutting implements have been inserted within the receptacle 5 the plate 24 will retain the blades thereof in such a position that they will not come in contact with the walls of the receptacle 5, and as the bulb 20 is embedded within the front inner wall of the receptacle the blades of the cutting implements are not likely to come in contact therewith, but at the same time this bulb is in constant contact with the water contained within this chamber 5.

Having thus fully described our invention, what we claim as new and desire to secure by Letters Patent is:

1. A sterilizer of the character described, comprising a receptacle having a chamber therein, means for heating water contained within said receptacle, a plate supported within said receptacle, and said plate having slots therein.

2. A sterilizer of the character described, comprising a receptacle having a chamber therein for holding water to be heated, a jacketed wall for said receptacle, means for supplying steam to said jacketed front wall, a thermometer secured to the outer face of said jacketed front wall, and the bulb of said thermometer extending within said chamber, substantially as and for the purpose specified.

3. A sterilizer of the character described, comprising a rectangular receptacle having a chamber therein, means for supplying to and exhausting water from said chamber, the front wall of said receptacle having a chamber therein, means for supplying a heating medium to said chamber of the front wall, a slotted plate arranged within the upper end of the first mentioned chamber, a hingedly connected cover for the top of said receptacle, and a thermometer secured to the outer wall of said receptacle for indicating the temperature of the water contained within said first mentioned chamber, substantially as and for the purpose specified.

In witness whereof we have hereunto set our hands.

DAVID E. DUFRESNE.
WILLIAM ADAMSON.

Copies of this patent may be obtained for five cents each, by addressing the "Commissioner of Patents, Washington, D. C."